United States Patent
Honsinger et al.

(10) Patent No.: US 6,721,459 B1
(45) Date of Patent: Apr. 13, 2004

(54) STORING SHARPNESS DATA USING EMBEDDED CARRIERS

(75) Inventors: Chris W. Honsinger, Webster, NY (US); John E. Kaufman, Rochester, NY (US)

(73) Assignee: Eastman Kodak Company, Rochester, NY (US)

( * ) Notice: Subject to any disclaimer, the term of this patent is extended or adjusted under 35 U.S.C. 154(b) by 0 days.

(21) Appl. No.: 09/454,100

(22) Filed: Dec. 3, 1999

(51) Int. Cl.$^7$ .................................................. G06K 9/38
(52) U.S. Cl. ........................ 382/263; 382/275; 382/280
(58) Field of Search ................................ 382/254–275, 382/277–280, 162–167; 350/500–540

(56) References Cited

U.S. PATENT DOCUMENTS

| | | | | |
|---|---|---|---|---|
| 5,453,844 A | * | 9/1995 | George et al. ............... | 382/280 |
| 5,535,291 A | * | 7/1996 | Spencer et al. ............. | 382/276 |
| 5,561,611 A | | 10/1996 | Avinash ...................... | 364/553 |
| 5,613,013 A | * | 3/1997 | Schuette ..................... | 280/295 |
| 5,696,850 A | | 12/1997 | Parulski et al. ............. | 382/261 |
| 5,835,639 A | | 11/1998 | Honsinger et al. .......... | 382/278 |
| 5,850,481 A | | 12/1998 | Rhoads | |
| 5,859,920 A | * | 1/1999 | Daly et al. .................. | 382/279 |
| 5,905,819 A | | 5/1999 | Daly .......................... | 382/284 |

FOREIGN PATENT DOCUMENTS

| | | | | |
|---|---|---|---|---|
| EP | 0 765 090 A2 | 3/1997 | .......... | H04N/9/804 |
| EP | 0788070 A2 | * 7/1997 | ............. | G06T/5/20 |

OTHER PUBLICATIONS

"Digital Image Processing" by R.C. Gonzalez and R.E. Woods. Addison–Wesley, Reading, USA, pp. 270–282.

* cited by examiner

Primary Examiner—Jingge Wu
(74) Attorney, Agent, or Firm—Peyton C. Watkins

(57) ABSTRACT

A digital image processing method includes the steps of embedding a delta function in a digital image; subjecting the digital image to an intermediate processing step, the intermediate processing step having a modulation transfer function (MTF) that blurs the image; extracting the delta function from the processed digital image; and estimating the MTF from the recovered delta function. The blur is removed from the image by generating a sharpening filter that is substantially the inverse of the MTF and applying the sharpening filter to the blurred image to produce an improved image.

12 Claims, 4 Drawing Sheets

STORING SHARPNESS DATA USING EMBEDDED CARRIERS

FIELD OF THE INVENTION

The invention relates generally to the field of image processing, and in particular to image enhancement and more particularly to image sharpening.

BACKGROUND OF THE INVENTION

When images are subjected to intermediate processing steps such as printing and rescanning, the quality of the image may be reduced i.e., the sharpness of the images may be degraded, due to the limited modulation transfer function (MTF) of the intermediate processing steps. It is known to apply sharpening filters to images in an attempt to improve the appearance of the image either because they have been degraded by intermediate processing steps, or because they are being optimized for display on a particular medium. For example, digital images that are transmitted over the Internet are optimized for display on CRTs by applying a predetermined amount of sharpening. If the sharpened image is subsequently printed and rescanned, it is possible that more sharpening will be applied to the image in an attempt to improve its appearance. Unfortunately, if an image is oversharpened, its quality can be further reduced. Because of this, a digital image having an unknown processing history cannot be automatically sharpened by a predetermined amount prior to display. An operator is generally required to view the effects of different amounts of sharpening and select the one that produces the most improvement without reducing the quality of the image.

There is a need therefore for an improved method of sharpening digital images prior to display, and therefore to be able to know how much an image has been degraded due to the MTF of intermediate processing steps, and/or sharpened so that an optimal level of sharpening can be applied to the image when it is displayed.

SUMMARY OF THE INVENTION

The problem is solved according to the present invention by providing a digital image processing method including the steps of embedding a delta function in a digital image; subjecting the digital image to an intermediate processing step, the intermediate processing step having a modulation transfer function (MTF) that blurs the image; extracting the delta function from the processed digital image; and estimating the MTF from the recovered delta function. The blur is removed from the image by generating a sharpening filter that is substantially the inverse of the MTF and applying the sharpening filter to the blurred image to produce an improved image.

The processing method has the advantages of avoiding oversharpening an image and eliminating the need for an operator to select the amount of sharpening applied to an image for display.

DETAILED DESCRIPTION OF THE INVENTION

Figure 1:
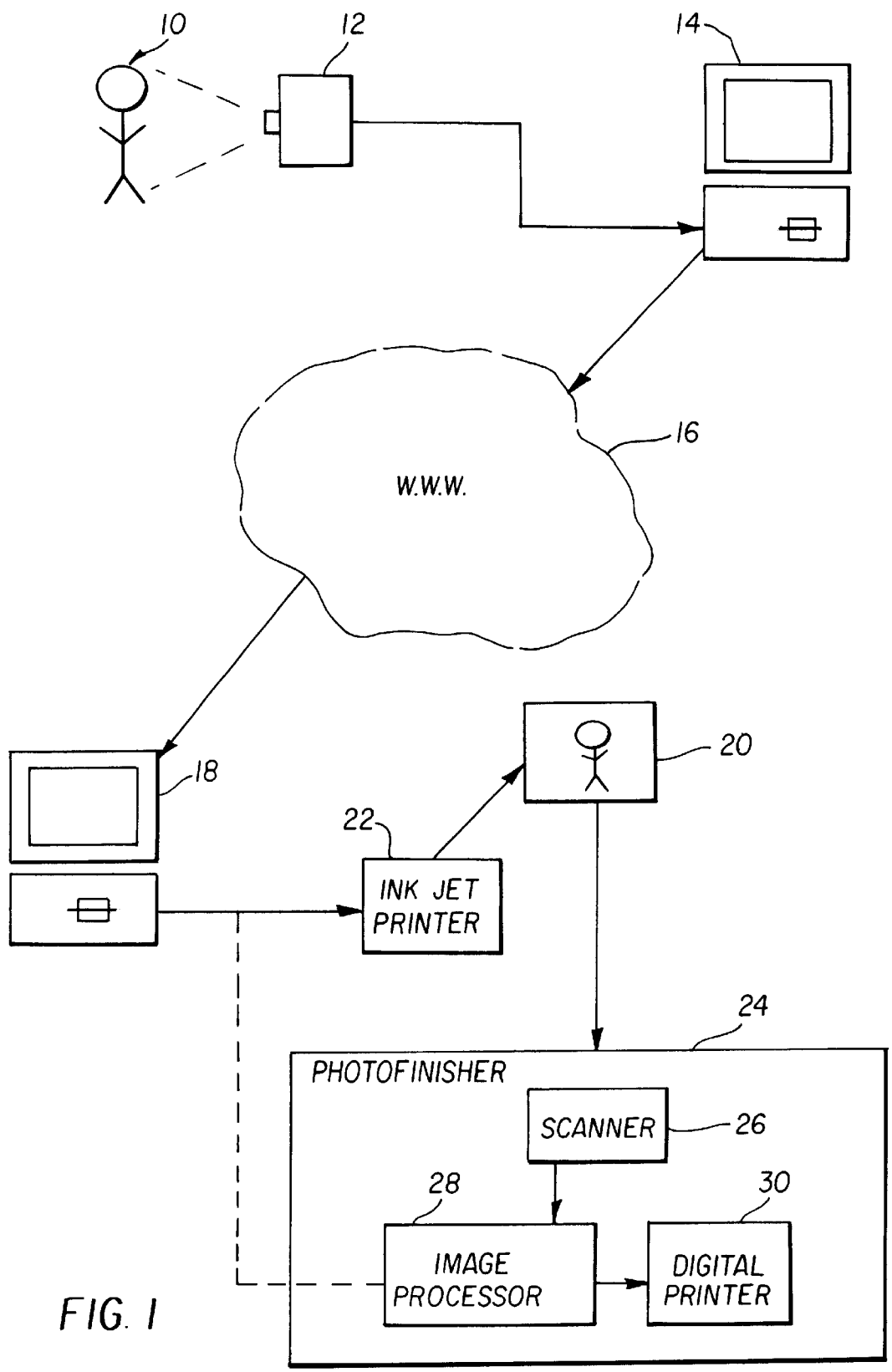
FIG. 1 is a block diagram illustrating a digital imaging system capable of performing several steps of intermediate processing and sharpening.

Referring to FIG. 1, an image of a subject 10 is captured by a camera 12 employed by person A. The camera 12 may be an electronic camera of the type that directly produces a digital image. Alternatively the camera can be a conventional film camera that produces a film image that can be scanned to produce a digital image. The digital image is supplied to a first personal computer 14 operated by person A and is sent over the World Wide Web 16 to a second personal computer operated by person B. Person B enlarges the image on his computer 18, sharpens it somewhat and makes a print 20 on his ink jet printer 22. Person B approves of the image and would like to obtain a number of copies on a more desirable output medium, such as silver halide photographic paper. He takes the ink jet print to a photofinisher 24 and asks to have 8×10 inch copies of the image made from the ink jet print 20. The photofinisher scans the ink jet print on a scanner 26 to produce a digital image, applies additional processing to the digital image, such as image sharpening, in an image processing computer 28 and sends the processed digital image to a silver halide digital photographic printer 30. Alternatively, person B may have taken or sent the digital image directly from his personal computer 18 to the photofinisher without the intermediate steps of processing and printing.

Several of the steps described above had the potential for degrading the image due to an imperfect MTF, and/or sharpening the image using digital image processing. If the photofinisher knows how much image degradation and/or sharpening was carried out on the image after the original capture by person A, he can calculate the optimal level of sharpening to be applied to the digital image prior to printing on the silver halide printer 30.

This information is supplied according to the present invention by embedding a delta function in the original image, either at the time of capture by the camera 12, or shortly thereafter in personal computer 14. The delta function is an image of a spot (preferably one pixel) that has, for example a magnitude of one in a bed of zeros. The delta function is effectively convolved with a carrier having a substantially flat Fourier amplitude and random phase to disperse the information contained in the delta function over a finite region of the image, thereby rendering the delta function invisible to the human eye when added to the image.

A method for constructing such a carrier having a substantially flat Fourier amplitude random phase is shown and described in U.S. Pat. No. 6,044,156, issued on Mar. 28, 2000, by Honsinger et al., entitled "Method for Generating An Improved Carrier For Use In An Image Data Embedding Application." The carrier is designed in the Fourier frequency domain. In the Fourier domain, the value of the carrier at each frequency is characterized by a complex number that can be represented as either a real/imaginary pair or as an amplitude/phase pair. The carrier is designed in the Fourier domain in such a way that the carrier's amplitude at each frequency is a constant and the carrier's phase at each frequency is a random number that is uniformly distributed between 0 and 360 degrees. The autocorrelation of such a carrier has a shape resembling a delta function with small sidelobes. It should be noted that if there is only one delta function, the carrier itself is equivalent to the convolution of the carrier with the delta function.

Each step of intermediate processing and/or image sharpening will affect the envelope of the delta function. The processing history of the image can be determined by recovering the delta function and deriving the Fourier amplitude of the processed delta function, which is equivalent to the combined MTF of the intermediate processing steps.

Figure 2:
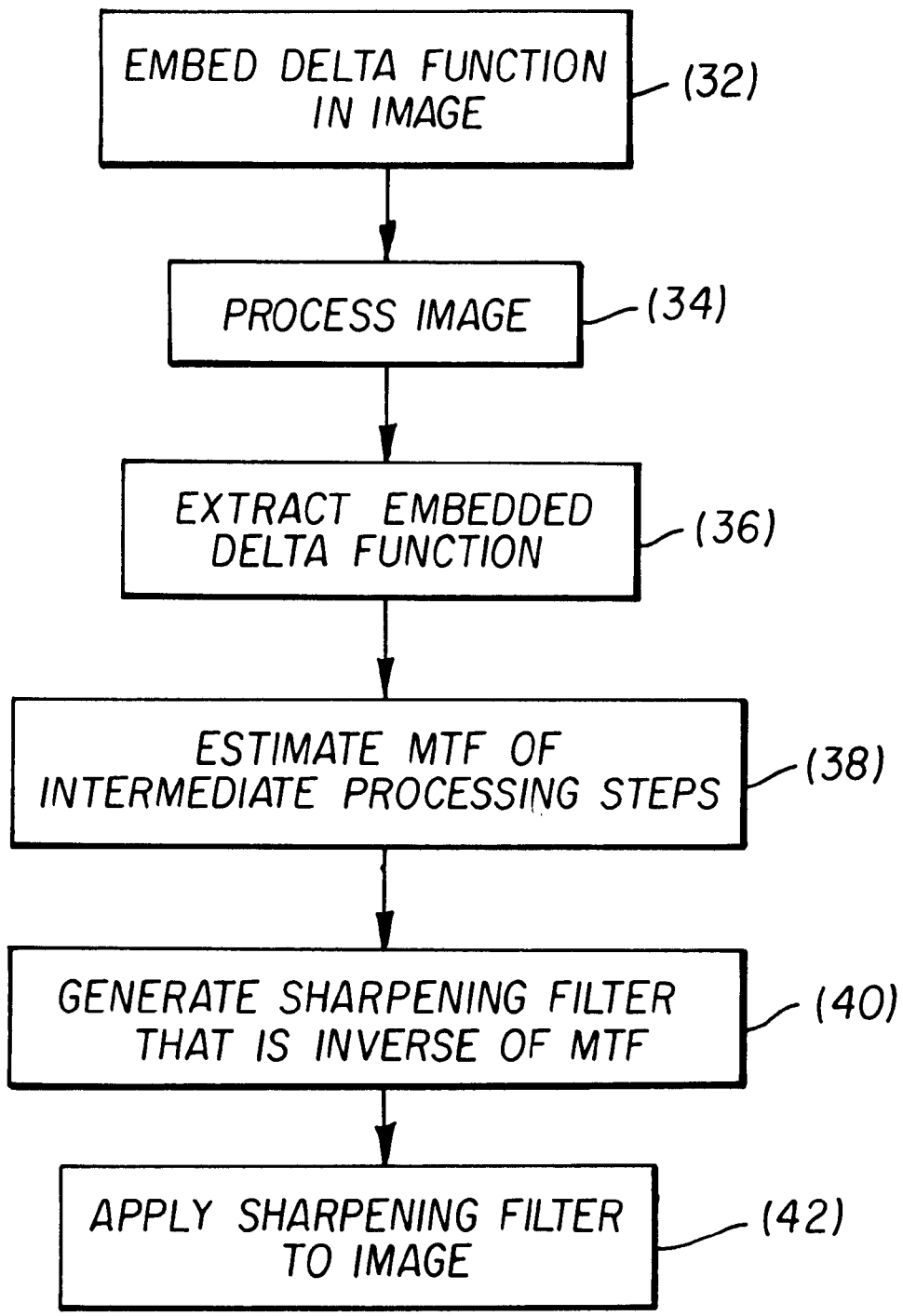
FIG. 2 is a flow chart showing the steps of the present invention.

Turning to FIG. 2, the invention includes the following steps. First a delta function is embedded (32) in an image. Next, the image having the embedded delta function is processed (34) through a number of intermediate processing steps such as sharpening, printing and scanning. Prior to a further step of printing, the delta function is extracted (36) from the image. An estimate of the combined MTF of the intermediate processing steps is then made (38) from the extracted delta function. A sharpening filter is generated (40) that is the inverse of the combined MTF. Finally, the sharpening filter is applied (42) to the processed image prior to the further step of printing the image.

Figure 3:
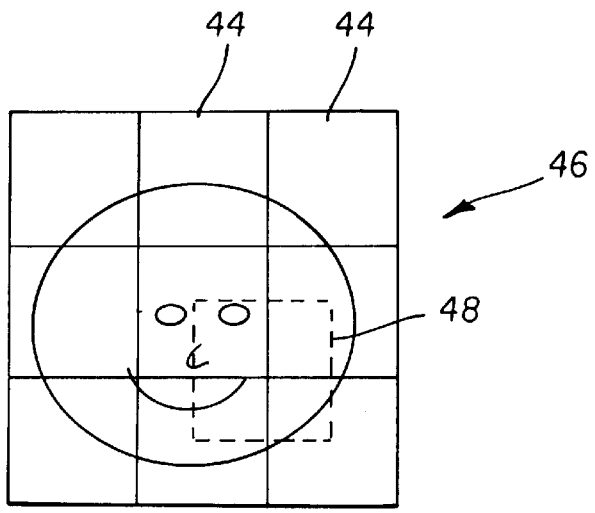
FIG. 3 is a diagram showing an image tiled with an embedded delta function, useful in describing the operation of the present invention.

In a preferred embodiment of the invention, the carrier (which is equivalent to a single delta function convolved with the carrier) is a 128×128 block of random numbers having the properties of flat Fourier amplitude and random phase. Turning to FIG. 3, 128×128 blocks 44 of carrier are added to a digital image 46 in a tile like fashion to cover the image.

Figure 4:
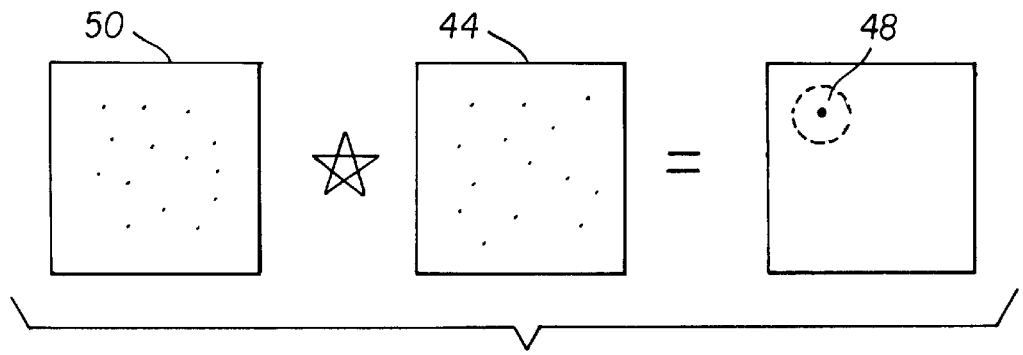
FIG. 4 is a diagram showing the recovery of the delta function from an arbitrary region of the image in FIG. 3, useful in describing the operation of the present invention.

As shown in FIG. 4, the delta function 48 is recovered from the image by taking an arbitrary 128×128 block 50 of image data and correlating the block 50 with the carrier 44. The location of the delta function in the block of recovered data will depend upon the location of the arbitrary block 50 with respect to the boundaries of the tiled carriers, but is not important for the following description. The recovered delta function will exhibit degradation due to the intermediate processing steps.

Figure 5:
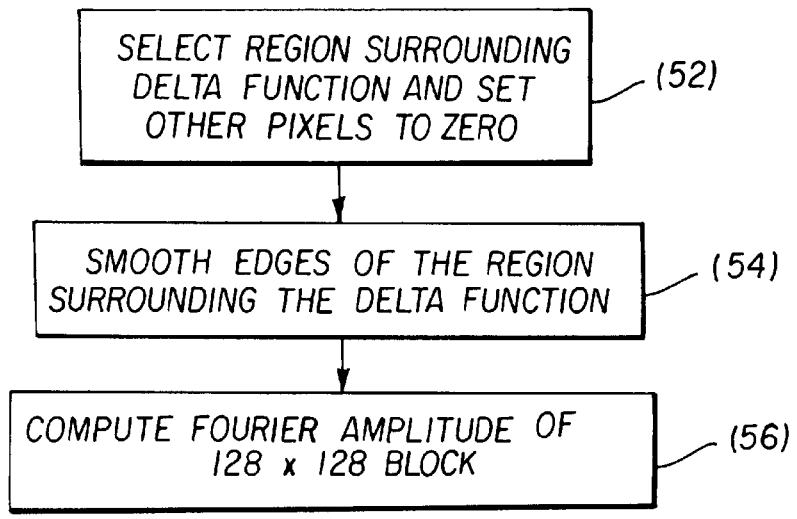
FIG. 5 is a flow chart illustrating the steps in deriving the MTF from the recovered delta function.
Figure 6:
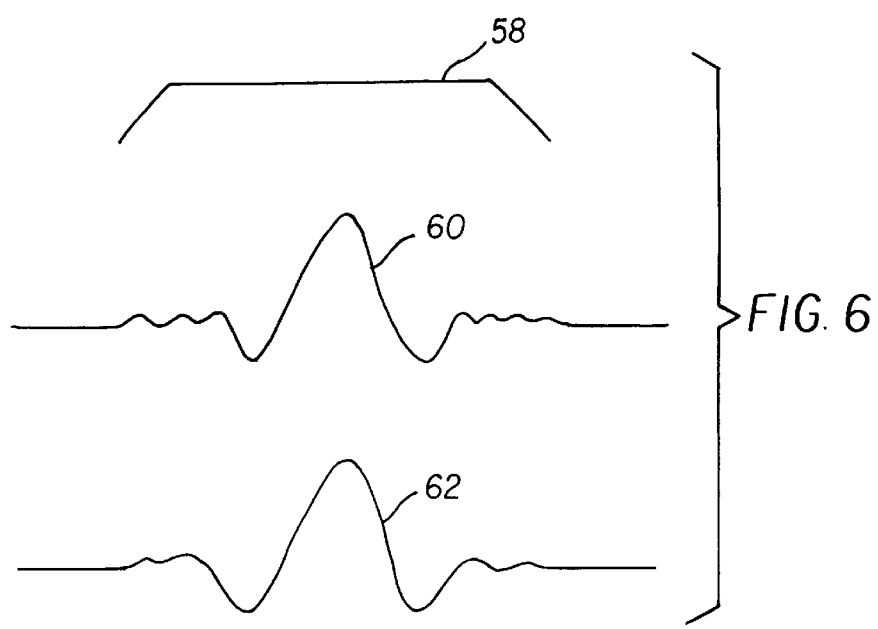
FIG. 6 is an illustration of a ramping function applied to the region containing the delta function to smooth the edges of the region.

Referring to FIG. 5, the combined MTF is determined from the recovered delta function as follows. A region surrounding the delta function is selected (52) and the remaining pixels in the recovered block are set to zero. In a preferred embodiment with a carrier of 128×128 pixels, the region containing the delta function will generally be about 12 pixels in diameter with the delta function at its center. The Fourier amplitude of the block containing the zeros and the delta function is then computed (56) preferably by applying a fast Fourier transform to the 128×128 block of pixels representing the recovered delta function. The Fourier amplitude is the square root of the sum of the real squared plus the imaginary squared Fourier coefficients. The result is equivalent to the combined MTF of the intermediate processing steps. In a preferred mode of practicing the invention, the region surrounding the delta function is smoothed (54) at its edges by applying a ramping function to the delta function data that ramps up from zero to one over about 3 pixels at the edge of the region containing the delta function. FIG. 6 illustrates the ramping function 58, the region including the delta function 60, and the smoothed region 62 after applying the ramping function. This processing step has the effect of reducing ringing in the MTF estimate.

Figure 7:
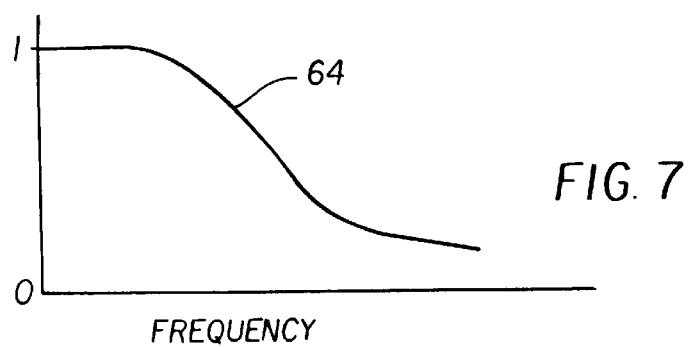
FIG. 7 is a graph showing the Fourier amplitude.
Figure 8:
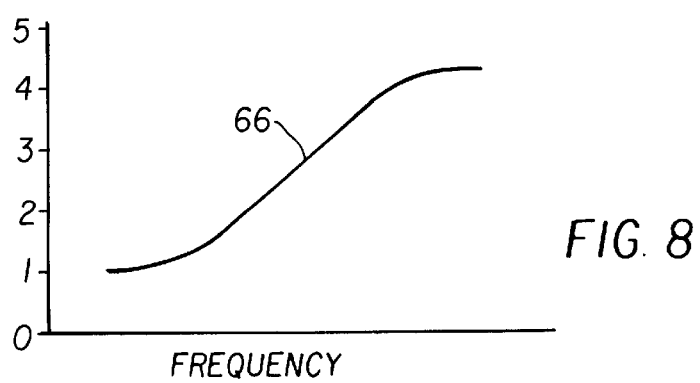
FIG. 8 is a graph showing the inverse Fourier amplitude.

FIG. 7 shows a plot 64 of a typical Fourier amplitude. FIG. 8 shows a plot 66 of the inverse Fourier amplitude, which is the specification for a sharpening filter that is applied to the image prior to printing on silver halide printer 30 (see FIG. 1). The sharpening filter as shown in FIG. 8 can be applied to the image in the frequency domain. Alternatively, a simple sharpening filter having approximately the same frequency response shown in FIG. 8 can be applied to image in the spatial domain by convolving the filter with the image.

According to a further alternative, the sharpening filter is derived using Wiener estimation techniques. If the noise characteristics of the intermediate processing apparatus are known, a Wiener filter can be derived in the frequency domain by dividing the MTF by the sum of the square of the MTF plus the square of the noise. The resulting Wiener filter is substantially the inverse of the MTF and maximizes the signal to noise ratio of the sharpening process.

Although the invention has been described with reference to embedding one delta function in the image for the purposes of tracking the changes to the image due to the MTF of intermediate processing steps and then generating an optimum sharpening filter based on the MTF, there are several known techniques where data is embedded in images for other purposes such as digital signatures, water marks, etc. Some of these techniques employ carriers that can be used in the present invention. See for example the techniques disclosed in U.S. Pat. No. 5,850,481 issued Dec. 15, 1998 to Rhoads, entitled "Steganographic System," or in U.S. Pat. No. 6,044,156, issued on Mar. 28, 2000, by Honsinger et al., entitled "Method ForGenerating An Improved Carrier For Use In An Image Data Embedding Application." In the technique described by Rhoads, a plurality of carriers are employed, each carrier representing one bit of data. In the technique described by Honsinger, a pattern of data bits is convolved with a single carrier. Individual bits that were embedded in an image using either of these techniques can be recovered and employed according to the present invention to generate the MTF of intermediate processing steps, and to design an optimum sharpening filter that is substantially the inverse of the MTF.

The delta function embedding step of the present invention can be employed in a digital camera to embed the delta function at the time of image capture. One application that is envisioned is to embed the delta function in an image captured by a satellite born camera in space. Alternatively, the embedding step can be performed in a digital image processing program in a personal computer or other digital image processing apparatus that receives the digital image after capture. In any event, the method can be implemented by a computer program and stored on a computer readable storage medium.

The invention has been described in detail with particular reference to certain preferred embodiments thereof, but it will be understood that variations and modifications can be effected within the spirit and scope of the invention.

Parts List 10 photographic subject
12 camera
14 personal computer
16 World Wide Web
18 personal computer
20 ink jet print
22 ink jet printer
24 photofinisher 26 scanner
28 image processing computer
30 digital photographic printer
32 embed delta function step
34 intermediate processing step
36 extract delta function step
38 estimate MTF step
40 generate sharpening filter step
42 apply sharpening filter to image step
44 128×128 carrier block
46 digital image
48 delta function
50 arbitrary 128×128 block from image
52 select region surrounding delta function step
54 smooth edge of region step
56 compute Fourier amplitude step
58 ramping function
60 region containing delta function
62 smoothed region containing delta function
64 typical Fourier amplitude plot
66 inverse Fourier amplitude plot

What is claimed is:

1. A digital image processing method comprising the steps of:
   a) embedding a delta function in a digital image;
   b) subjecting the digital image to an intermediate processing step, the intermediate processing step having a modulation transfer function (MTF) that blurs the image;
   c) extracting the delta function from the processed digital image;
   d) estimating the MTF from the recovered delta function;
   e) generating a sharpening filter that is substantially the inverse of the MTF; and
   f) applying the sharpening filter to the blurred image to produce an improved image;
   wherein the step of estimating the MTF from the recovered delta function comprises the steps:
   d1) selecting a region of data in the block that includes the delta function;
   d2) setting the rest of the block to zeros; and
   d3) computing the Fourier amplitude of the selected region.

2. The method claimed in claim 1, wherein the Fourier amplitude is computed by applying a fast Fourier transform to the block.

3. The method claimed in claim 1, further comprising the step of smoothing the edge of the region prior to finding the Fourier amplitude.

4. The method claimed in claim 1, wherein the sharpening filter is a Wiener filter derived in the frequency domain by dividing the MTF by the sum of the square of the MTF plus the square of the noise.

5. The method claimed in claim 1, wherein the step of embedding a delta function in a digital image, comprises the steps of adding a carrier having a substantially flat Fourier amplitude spectrum and random phase to the digital image.

6. The method claimed in claim 5, further comprises convolving the carrier with a pattern of data bits prior to adding the carrier to the image.

7. A computer program embodied on a computer-readable storage medium for processing a digital image, comprising the steps of:
   a) embedding a delta function in a digital image;
   b) subjecting the digital image to an intermediate processing step, the intermediate processing step having a modulation transfer function (MTF) that blurs the image;
   c) extracting the delta function from the processed digital image;
   d) estimating the MTF from the recovered delta function;
   e) generating a sharpening filter that is substantially the inverse of the MTF; and
   f) applying the sharpening filter to the blurred image to produce an improved image;
   wherein the step of estimating the MTF from the recovered delta function comprises the steps:
   d1) selecting a region of data in the block that includes the delta function;
   d2) setting the rest of the block to zeros; and
   d3) computing the Fourier amplitude of the selected region.

8. The computer program claimed in claim 7, wherein the Fourier amplitude is computed by applying a fast Fourier transform to the block.

9. The computer program claimed in claim 7, further comprising the step of smoothing the edge of the region prior to finding the Fourier amplitude.

10. The computer program claimed in claim 7, wherein the sharpening filter is a Wiener filter derived in the frequency domain by dividing the MTF by the sum of the square of the MTF plus the square of the noise.

11. The computer program claimed in claim 7, wherein the step of embedding a delta function in a digital image, comprises the steps of adding a carrier having a substantially flat Fourier amplitude spectrum and random phase to the digital image.

12. The computer program claimed in claim 11, further comprises convolving the carrier with a pattern of data bits prior to adding the carrier to the image.

* * * * *